United States Patent [19]

Nicholson et al.

[11] Patent Number: 5,293,622
[45] Date of Patent: Mar. 8, 1994

[54] COMPUTER SYSTEM WITH INPUT/OUTPUT CACHE

[75] Inventors: James O. Nicholson; John C. O'Quin, III; John T. O'Quin, II; Frederick E. Strietelmeier, all of Austin, Tex.

[73] Assignee: International Business Machines Corporation, Armonk, N.Y.

[21] Appl. No.: 919,817

[22] Filed: Jul. 24, 1992

Related U.S. Application Data

[63] Continuation of Ser. No. 711,343, May 31, 1991, Pat. No. 5,161,219, which is a continuation of Ser. No. 297,775, Jan. 13, 1989, abandoned.

[51] Int. Cl.$^5$ .................... G06F 12/02; G06F 13/00
[52] U.S. Cl. ...................... 395/425; 365/49;
365/189.01; 365/230.01; 365/230.03; 364/243;
364/243.4; 364/243.41; 364/243.44; 364/228.1;
364/DIG. 1
[58] Field of Search .......... 395/425, 400, 275, 200,
395/325; 365/49, 230.01, 230.03, 189.01;
340/825; 364/134; 370/85.1

[56] References Cited

U.S. PATENT DOCUMENTS

| | | | |
|---|---|---|---|
| 4,051,461 | 9/1977 | Hashimoto et al. | 364/900 |
| 4,141,067 | 2/1979 | McLagan | 364/200 |
| 4,212,057 | 7/1980 | Devlin et al. | 364/200 |
| 4,264,953 | 4/1981 | Donglas et al. | 364/200 |
| 4,410,944 | 10/1983 | Kronies | 364/200 |
| 4,445,174 | 4/1984 | Fletcher | 364/200 |
| 4,484,262 | 11/1984 | Sullivan et al. | 364/200 |
| 4,591,977 | 5/1986 | Nissen et al. | 364/200 |
| 4,843,542 | 6/1989 | Dashiell et al. | 364/200 |
| 5,029,070 | 7/1991 | McCarthy et al. | 395/425 |
| 5,140,681 | 8/1992 | Uchiyama et al. | 395/425 |
| 5,195,089 | 3/1993 | Sindhu et al. | 370/85.1 |
| 5,228,136 | 7/1993 | Shimizu et al. | 395/425 |
| 5,247,648 | 9/1993 | Watkins et al. | 395/425 |
| 5,263,142 | 11/1993 | Watkins et al. | 395/425 |
| 5,265,235 | 11/1993 | Sindhu et al. | 395/425 |

OTHER PUBLICATIONS

"Coherence Problem in a Multicache System", by W. Yen and K. Fu, IEEE, 1982, pp. 332-339.

Andrew W. Wilson, Jr., "Hierarchical Cache/Bus Architecture for Shared Memory Multiprocessors" Computer Architecture Conference (IEEE/ACM), 1987, pp. 244-252.

IBM Technical Disclosure Bulletin, vol. 29, No. 4, Sep. 1986, "Translated Address Cache in Computer Systems with Extended Memory Addressing" pp. 1483-1484.

*Primary Examiner*—Gopal C. Ray
*Attorney, Agent, or Firm*—Kenneth C. Hill; Andrew J. Dillon

[57] ABSTRACT

A computer system has a cache located between input/output devices and a main system memory. All system memory accesses by the input/output devices are made through the cache. Memory accesses through the cache are limited to those addresses which are accessible to a central processor and input/output devices. All access to such addresses by the central processor are made through the cache.

5 Claims, 2 Drawing Sheets

COMPUTER SYSTEM WITH INPUT/OUTPUT CACHE

This application is a continuation of application Ser. No. 07/711,343, filed May 31, 1991, now issued as U.S. Pat. No. 5,161,219, which was a continuation of application Ser. No. 07/297,775, filed 13 Jan. 1989, now abandoned.

CROSS-REFERENCE TO RELATED APPLICATIONS

The present application contains subject matter related to application Ser. No. 297,712 now abandoned, entitled INPUT/OUTPUT CACHE, and application Ser. No. 297,779, now abandoned, entitled INPUT/OUTPUT CACHE WITH ACCESS PROTECTION, both filed on Jan. 13, 1989 and assigned to the assignee hereof, and both of which are incorporated by reference herein.

BACKGROUND OF THE INVENTION

1. Technical Field

The present invention is related generally to computer systems, and more specifically to computer systems containing cache memories.

2. Background Art

Computer systems generally have several different storage layers defining a memory hierarchy. These layers typically include registers in a central processing unit, main system memory, and mass storage, such as disks. The performance of these different levels is quite different. The processor registers are much faster than system memory, which in turn is significantly faster than access to mass storage.

In order to improve system performance, a cache consisting of a small, fast memory, is often used between the central processor and system memory. The cache takes advantage of the locality of reference phenomenon within computer programs to store data which is likely to be reused into the fast memory.

The use of a cache memory between the central processor and system memory allows the system memory to be designed for high speed access. Transfer of data between the cache memory and the system memory is performed as block transfers which have a length dependent upon the cache memory design. The system memory design can be optimized for block data transfers to take advantage of this. For example, interleaved memory accessing can be used for the main system memory.

In many systems, input/output devices also have access to the main system memory. In systems of this type, the main memory cannot be designed to only support block transfers, because the input/output devices are generally not capable of block data transfers. In fact, many input/output devices, such as keyboards and input/output ports, are single character oriented devices.

Many cache designs for use between the central processor and system memory do not allow use by the input/output devices and overall system performance is adversely affected. Input/output devices must access system memory at their lower performance levels. Although the central processor can operate on data in its cache at any time, a cache miss causes the central processor to wait whenever an input/output device is performing a read to, or write from, system memory.

It would be desirable to provide a computer system which allows efficient access of a system memory by input/output devices. It would also be desirable for a computer system to provide that the performance central processor access to system memory is not greatly degraded during system memory access by input/output devices.

SUMMARY OF THE INVENTION

It is therefore an object of the present invention to provide a computer system which allows input/output devices to efficiently access main system memory.

It is another object of the present invention to provide a computer system which allows efficient access of system memory by input/output devices in which the performance of central processor accesses to system memory are not greatly degraded during input/output access.

It is a further object of the present invention to provide such a computer system in which the central processor and input/output devices are allowed access to common memory locations.

Therefore, according to the present invention, a computer system has a central processor, a system memory, and input/output devices. An input/output cache is located between the input/output devices and the system memory, and all system memory accesses by input/output devices are made through the cache. If the central processor accesses a system memory location which is also accessible by an input/output device, such access is made through the input/output cache.

BRIEF DESCRIPTION OF THE DRAWINGS

The novel features believed characteristic of the invention are set forth in the appended claims. The invention itself however, as well as a preferred mode of use, and further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
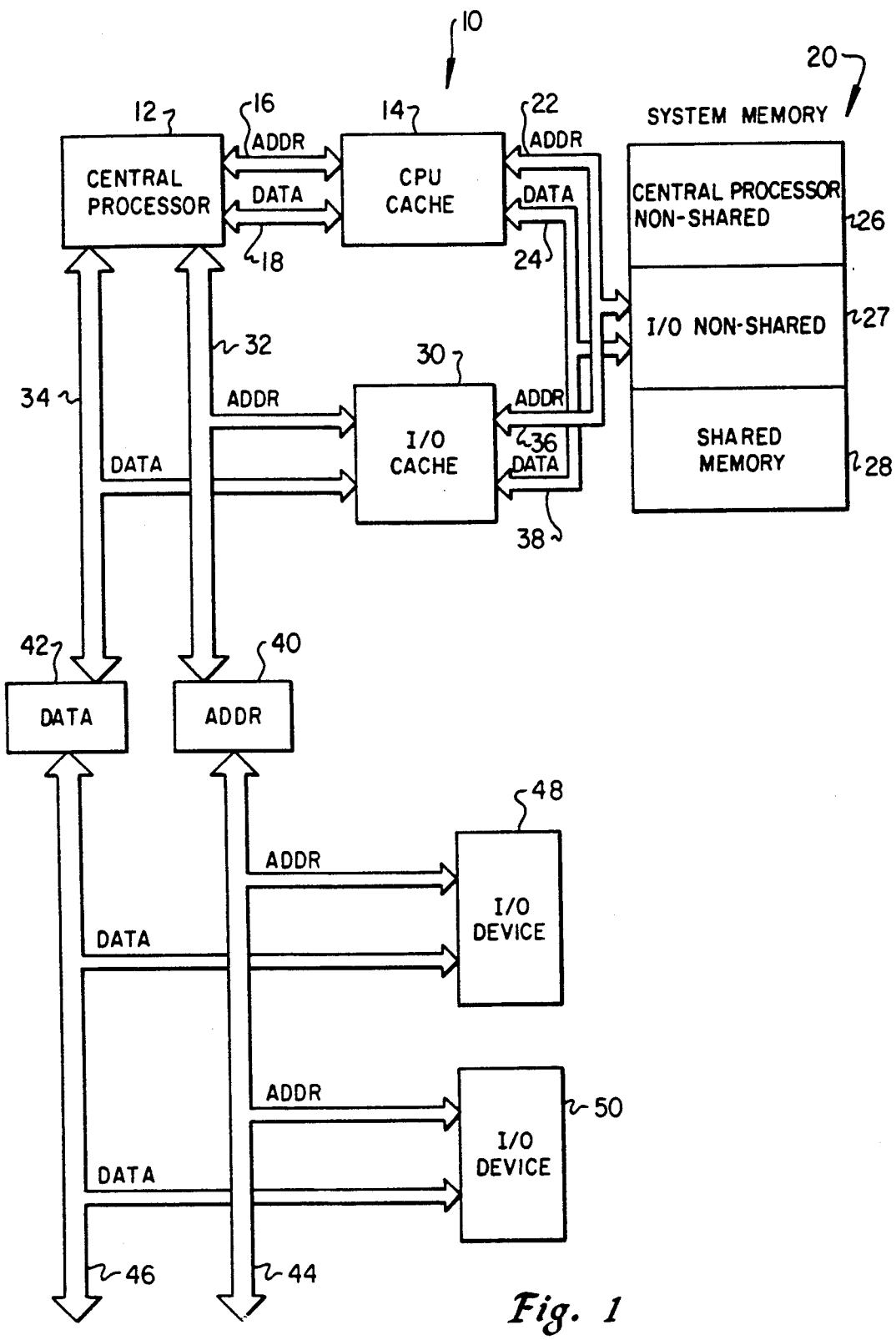
FIG. 1 is a block diagram of a computer system according to the present invention.

Referring to FIG. 1, a computer system 10 contains a central processor 12. A central processor cache 14 is attached to the central processor 12 through address signal lines 16 and data signal lines 18. The central processor cache 14 is connected to a system memory 20 through address signal lines 22, and data signal lines 24.

The system memory 20 is divided into a central processor non-shared memory portion 26, an I/O non-shared memory portion 27, and a shared memory portion 28. Although the central processor non-shared memory 26, the I/O non-shared memory 27 and shared memory 28 may be physically separate memories, in the preferred embodiment they are merely selected portions of the address space for the system memory 20. A particular page in system memory 20 can move from one portion to the other. For example, a page could be in I/O non-shared memory 27 while an I/O device is loading an executable file into that page, and then reassigned to central processor non-shared memory 26 for execution. It is not necessary that shared memory 28 be contiguous. In a virtual memory system, selected virtual pages will generally be reserved for shared memory 28. Since a virtual page can be located anywhere within physical memory, the shared memory 28 pages will generally be scattered throughout the physical memory. The CPU cache 14 is not allowed to generate valid address signals into the shared memory 28.

An input/output cache 30 is connected to the central processor 12 through address signal lines 32 and data signal lines 34. The I/O cache 30 is also connected to the system memory 20 through address lines 36 and data lines 38.

The I/O cache 30 is not allowed to generate valid address signals which address the central processor non-shared memory 26. The shared memory 28 addresses accessible through the I/O cache 30 are used as memory locations which are accessible by either the central processor 12 or input/output devices. The I/O non-shared memory 27 locations are accessible only by input/output devices. Because the addressing constraints on the CPU cache 14 and the I/O cache 30, input/output devices can access only addressable locations within the shared memory or the I/O non-shared memory. The central processor 12 can access only the central processor non-shared memory 26 and the shared memory 28.

Address buffer 40 connects address signal lines 32 to an address bus 44. Data buffer 42 connects data signal lines 34 to a data bus 46. The address and data busses 44, 46, plus control signals (not shown), define an input/output bus, and all input/output devices are attached to this bus. FIG. 1 shows I/O device 48 and I/O device 50 attached to the address and data busses, 44, 46.

The input/output devices 48, 50, represent any type of input/output device which may be attached to the input/output bus 44, 46. For example, such devices can include keyboards, video display controllers, serial and parallel I/O ports, mass storage controllers, and real time machine controllers. In general, any computer subsystem other than the central processor 12, system memory 20, and the two caches 14, 30 is considered an input/output device.

Figure 2:
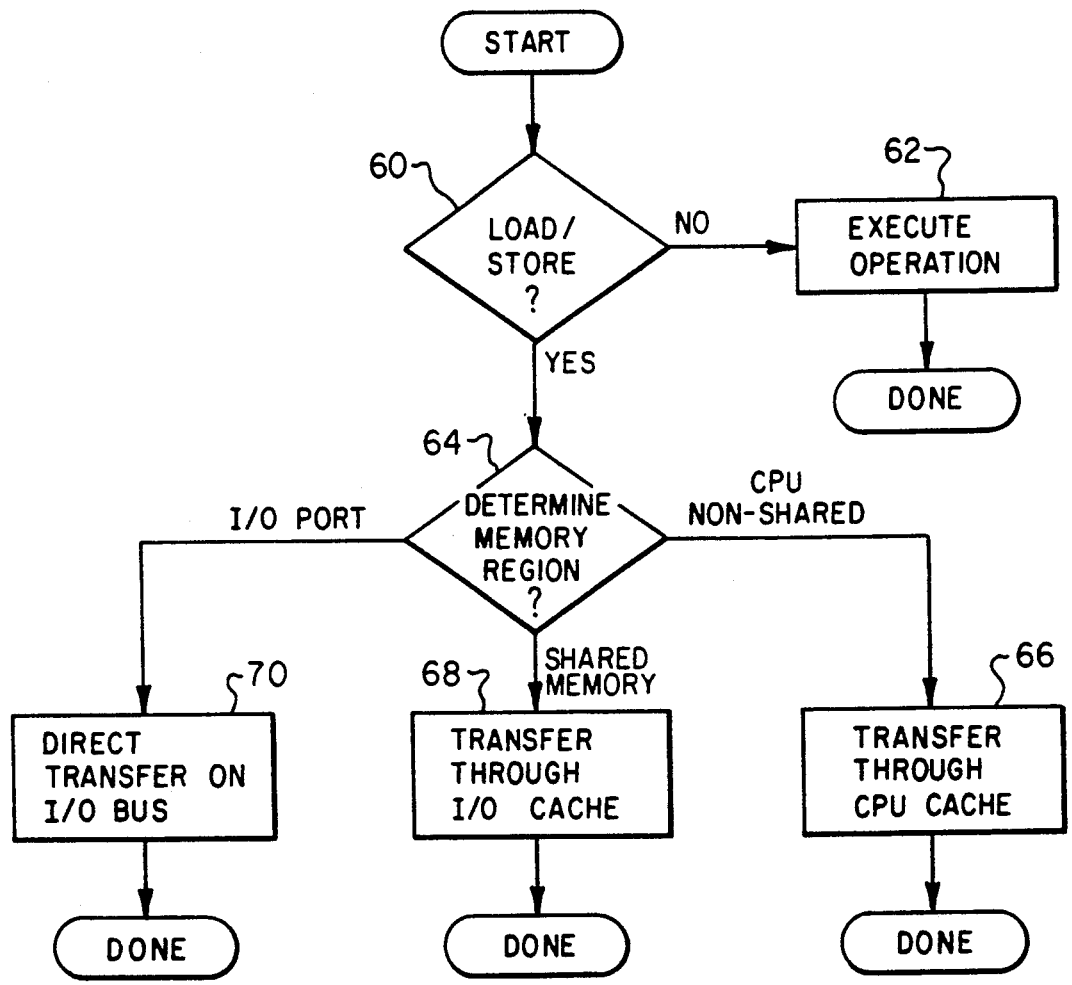
FIG. 2 is a flow chart illustrating operation of the computer system of FIG. 1.

FIG. 2 is a flow chart illustrating operation of the system of FIG. 1. For each instruction executed by the central processor 12, an instruction OPCODE determines whether the instruction is a load or store operation to memory 60. If the instruction is not a load or store, it is executed 62 in its usual manner.

If the operation is a load or store, the next step is to determine which memory region is being accessed 64. If the memory address indicates an access to the central processor non-shared memory 26, the memory transfer is made through the central processor cache 66. If the memory address is a location in shared memory 28, the transfer is made through the input/output cache 68. Since the central processor 12 makes all memory accesses into shared memory 28 through the input/output cache 30, there is no problem concerning each coherency between the central processor cache 14 and the input/output cache 30. The caches 14, 30 are not accessing any common memory locations, so it is not possible for the caches 14, 30 to hold different values for the same memory location.

If the test of step 64 determines that the operation is addressed to an input/output port, the central processor 12 performs a direct transfer on the input/output bus 70. Input/output ports reside in an address space separate and distinct from the system memory address space. A separate input/output address space is implemented in several widely used architectures, including the 80×86 family of microprocessors manufactured by Intel.

The flow chart of FIG. 2 describes memory access by the central processor 12. When input/output device makes a memory access, it is necessary only to perform the test of step 64 to determine if the access is to a location in system memory 20 or to an input/output port. If the transfer is to or from an input/output port, a direct transfer is made on the input/output bus, and shared memory and I/O non-shared memory 28 transfers are made through the input/output cache.

The system described above has several important features. Since the system memory 20 is accessed only through caches 14, 30, it can be optimized for high speed block transfers. A properly designed input/output cache 30 will give the same type of benefits for input/output device 48, 50 data transfer as the CPU cache 14 does for central processor 12 transfer. A preferred embodiment of an input/output cache 30 is described in detail in co-pending patent application Ser. No. 297,712, entitled INPUT/OUTPUT CACHE, which has been incorporated by reference herein.

An additional benefit of the use of an input/output cache 30 is that input/output devices and the central processor 12 can operate in parallel. The only conflicts which would arise to contemporaneous operation occur when the central processor 12 accesses an I/O port directly, when the central processor 12 accesses shared memory 28 through the input/output cache 30, or when both the central processor cache 14 and the input/output cache attempt to access the system memory 20 at the same time.

While the invention has been particularly shown and described with reference to a preferred embodiment, it will be understood by those skilled in the art that various changes in form and detail may be made therein without departing from the spirit and scope of the invention.

We claim:

1. In a computer system having a central processor for accessing virtual pages, an input/output device for accessing virtual pages, a system memory, a central processor cache connected to the central processor and the system memory, and an input/output cache connected to the system memory, to the central processor, and to the input/output device, a method of accessing the system memory comprising the steps performed by the computer system of:

allocating locations in the system memory among a central processor non-shared region, an input/output non-shared region, and a shared region;

addressing the central processor non-shared region through the central processor cache in response to an access of a virtual page stored in locations allocated to the central processor non-shared region, wherein such access can only be initiated by the central processor;

addressing the shared region through the input/output cache in response to an access of a virtual page stored in locations allocated to the shared region, wherein such accesses can be initiated by either the central processor or the input/output device; and addressing the input/output non-shared region through the input/output cache in response to an access of a virtual page stored in locations allocated to the input/output non-shared region, wherein such accesses can only be initiated by the input/output device.

2. The method of claim 1, wherein the computer system further includes an input/output bus coupled for data exchange to the central processor and to the input/output device, the method further comprising the steps of:
- determining whether a virtual page accessed by the central processor is in a location outside the system memory address space; and
- executing access of a location outside the system memory address space directly from a device, attached to the input/output bus, by the central processor without addressing either the central processor cache or the input/output cache.

3. A method for reading data from and writing data to a system memory in a computer system comprising the steps of:
- allocating locations in the system memory among a central processor non-shared region, an input/output non-shared region, and a shared region;
- reading, by a central processor, contents of locations in the central processor non-shared region from a central processor cache connected to the system memory and to the central processor, wherein the central processor cache reads the contents of such locations from the system memory and caches them for access by the central processor;
- writing data from the central processor to locations in the central processor non-shared region by writing such data to the central processor cache, which caches such data and writes it to the system memory;
- reading, by the central processor, contents of locations in the shared region from an input/output cache connected to the system memory, to an input/output device, and tot he central processor, wherein the input/output cache reads the contents of such locations from the system memory and caches them for access by the central processor;
- writing data from the central processor to locations in the shared region by writing such data to the input/output cache, which caches such data and writes it to the system memory;
- reading, by the input/output device, contents of locations in the shared region and in the input/output non-shared region from the input/output cache, wherein the input/output cache reads the contents of such locations from the system memory and caches them for access by the input/output device; and
- writing data from the input/output device to locations in the input/output non-shared region by writing such data to the input/output cache, which caches such data and writes it to the system memory.

4. The method of claim 3, wherein the input/output device is connected to the input/output cache by an input/output bus which is also connected to the central processor, and further comprising the steps of:
- obtaining, when the central processor reads a location which resides in an address space separate and distinct from a system address space defined by the locations in the system memory, the data in such location from the input/output device directly over the input/output bus without utilizing either the central processor cache or the input/output cache; and
- writing, when the central processor writes to a location which resides in the separate and distinct address space, the data to the input/output device directly over the input/output bus without utilizing either the central processor cache or the input/output cache.

5. The method of claim 4, wherein the location residing in the separate and distinct address space is an input/output port.

* * * * *